United States Patent [19]

Tenhover et al.

[11] Patent Number: 4,615,967

[45] Date of Patent: Oct. 7, 1986

[54] OPTICAL INFORMATION STORAGE MATERIAL

[75] Inventors: Michael A. Tenhover, Solon; Robert K. Grasselli, Aurora, both of Ohio

[73] Assignee: The Standard Oil Company, Cleveland, Ohio

[21] Appl. No.: 700,428

[22] Filed: Feb. 11, 1985

[51] Int. Cl.$^4$ ............................ G03F 7/02; G03C 1/00
[52] U.S. Cl. ................................... 430/270; 430/417; 430/495
[58] Field of Search ............... 430/270; 365/113, 127, 365/163, 417, 495

[56] References Cited

U.S. PATENT DOCUMENTS

| | | | |
|---|---|---|---|
| 3,716,844 | 2/1973 | Brodsky | 340/173 |
| 3,801,966 | 4/1974 | Terao | 365/113 |
| 4,183,094 | 1/1980 | Keezer et al. | 365/127 |
| 4,199,357 | 4/1980 | Yoshida et al. | 430/270 |
| 4,286,045 | 8/1981 | Nahara et al. | 430/270 |
| 4,499,178 | 2/1985 | Wada | 430/495 |

*Primary Examiner*—John L. Goodrow
*Attorney, Agent, or Firm*—Jeffrey A. Wyand; Joseph G. Curatolo; Larry W. Evans

[57] ABSTRACT

A thin film device for recording information in readable form that decreases its light absorbancy in response to increased temperature. The film includes two elements from column IVa of the Periodic Table, such as silicon, germanium, tin and lead, bound with one of or a mixture of sulfur and selenium.

The as-deposited inventive materials contain tetrahedral units, some ethane-like units and some rings and chains. Upon heating the ethane-like units are converted to rings and chains and tetrahedral units producing a dramatically decreased light absorbancy. The materials are stable at relatively high operating temperatures.

8 Claims, No Drawings

OPTICAL INFORMATION STORAGE MATERIAL

BACKGROUND

Various materials have been disclosed for use in optical information storage devices. Optical memories store information by changing some optical characteristic of the storage medium such as light absorbancy or reflectivity usually in response to a stimulus. Typically, the stimulus is a temperature change produced locally in the optical information storage material by illumination with a laser, electron, x-ray or other beam of energy. Because a recording and reading energy beam can be focussed into a very small spot, optical memories permit high density storage of information. The information placed in the optical memory material by a "writing" beam can be retrieved by a "reading" laser or other light source and an appropriate detector. For an example, see U.S. Pat. No. 3,505,658 to Fan et al.

Optical memories formed of chalcogenides, i.e. glassy materials composed of mixtures of germanium, arsenic, tellurium and silicon, vanadium pentoxide, etc., were disclosed in U.S. Pat. No. 3,271,591 to Ovshinsky et al. These optical memory materials are characterized by an increase in optical absorbancy, i.e. opacity, as they are heated resulting from a change from an amorphous state to a crystalline state.

The chalcogenide materials may be used as the basis of various memory devices. One example using germanium-selenium compounds was disclosed in U.S. Pat. No. 4,183,094 to Keezer et al. Germanium-selenium compounds undergo subtle microstructure changes in the thermally induced transition of optical properties. These changes occur at relatively low temperatures (e.g. 50 to 100° C.) meaning that they can be difficult to control. The thermally induced shift in optical properties is relatively small, the band gap energy typically increasing only a few tenths of an electron-volt.

Amorphous silicon, germanium and silicon carbide were disclosed as optical memory materials in U.S. Pat. No. 3,716,844 to Brodsky. These materials also show a temperature dependent amorphous-to-crystalline transition, but their opacity decreases during that transition, in contrast to the chalcogenides. The thermally induced change in opacity typically represents change in band gap energy of less than one electron-volt.

When a material makes a transition from an amorphous to a crystalline state its density changes. That transition has a profound effect on the mechanical stability of the material and may even be considered a failure of the material. It is desirable to avoid such a transition in recording information in an optical memory in order to increase reliability.

It is an object of this invention to employ a material for optical information storage that has a thermally induced optical transition occurring at a sufficiently high temperature to ensure good thermal stability and in which a relatively large change in band gap energy is produced to ensure accurate readability of the stored information. This object is achieved by the use of multi-component films exhibiting transitions that do not involve the crystallization of the recording material.

SUMMARY OF THE INVENTION

In the invention, a group of materials for use in optical memories exhibiting sufficiently high optical transition temperatures to provide good control of such transitions and relatively large changes in optical characteristics are provided. The materials are preferably prepared as thin films including germanium or silicon combined with germanium, tin or lead, all of which is bound to selenium, sulfur or a mixture of selenium and sulfur. Such materials are preferably prepared by evaporation of their constituents and condensation of the vapors on a transparent substrate.

The preferred materials have optical transitions that take place at temperatures typically in the range of 300 to 400° C. Changes in band gap energies of 1.0 to 1.5 electron-volts are observed after heating of the inventive materials.

DETAILED DESCRIPTION OF PREFERRED EMBODIMENTS

The group of compounds that we have determined to be useful in optical information storage devices generally have the chemical formula

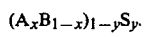

$(A_xB_{1-x})_{1-y}S_y.$

A and B are elements chosen from column IVa of the Periodic Table including silicon, germanium, tin and lead provided that A and B cannot be the same element. Preferably element A is germanium or silicon. Element B is preferably germanium, tin or lead. In the chemical formula, x must be greater than zero and less than one and y is at least 0.67 and must be less than one. Element S is either selenium, sulfur or a mixture of selenium and sulfur. These elements, and mixtures of them, can form chains and rings of atoms.

Table 1 shows the preferred combinations of elements A and B for various representative compounds.

TABLE I

|   | ex. 1 | ex. 2 | ex. 3 | ex. 4 | ex. 5 |
| --- | --- | --- | --- | --- | --- |
| A | Si | Si | Ge | Si | Ge |
| B | Ge | Sn | Sn | Pb | Pb |

A film of the inventive material consists of numerous different structural units. Typically, a large fraction of such a film is comprised of tetrahedral units produced as a result of the valence of the elements selected from column IVa of the Periodic Table. In the material of example 1 from Table I, such units would have the formula Si $(S_{0.5})_4$ and Ge $(S_{0.5})_4$, although more of the former units are expected to be produced than the latter, since x is assumed to be greater than one half. (If x were less than one half in this example, an interchange of elements A and B would raise x above one half and produce the same compound). Such films also include a number of ethane-like units, a structural example of which, for the material designated in Table I as example 1, is shown below.

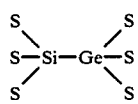

In the example, the ethane-like units have a heteropolar bond between silicon and germanium atoms and each silicon and germanium atom has three sulfur atoms bonded to it. It is the presence of the heteropolar bonds in the films as deposited that provides the relatively low initial band gap energy of the inventive materials. The materials as deposited also include rings and chains of the S element, be it selenium, sulfur or a mixture of the two.

When the inventive films are subjected to heat, the ethane-like units are transformed into tetrahedral units and rings and chains of selenium and/or sulfur. Because of this microstructure transformation, the optical properties of the material change. It is important to note that the transformation in the inventive materials is not an amorphous-to-crystalline transition as reported for the materials described in the patents to others cited in this disclosure. As a result, the amount of change in optical properties resulting from heating the inventive materials can be much larger than that observed with the amorphous/crystalline transition materials. For example, band gap energy increases in excess of one electron-volt are observed in the inventive materials.

The inventive materials may be prepared by any of a number of conventional techniques, such as sputtering, chemical vapor deposition, plating or evaporative deposition. Among these, we have used the latter technique. In this technique a source boat is loaded with an alloy having the desired composition of the information storage material. The boat is placed in a vacuum deposition apparatus which is evacuated, the boat is heated to vaporize the source materials and the vapor is condensed on a substrate.

Using the evaporative technique, we deposited a film approximately 100 nanometers thick and having a composition of $$(Si_{0.9}Sn_{0.1})_{0.3}S_{0.7}$$

on a glass slide. The deposition system was evacuated to a pressure of $10^{-6}$ torr before the source boat was heated to about 600° C. To protect the deposited film from moisture, we then deposited on it a 100 nanometer thick layer of cesium iodide by vacuum evaporation. Alternative protective materials, such as silicon dioxide, could be deposited on the film. In order to record information in, and read information from, the material, it is important that at least one of the substrate and any protective layer be transparent to the reading and writing medium.

The samples we prepared were initially opaque because of the presence of the ethane-like units. Upon heat treatment for one hour at 375° C. the samples became transparent to visible light with a slightly orange tinge. The optical transition corresponds to an increase in the material's band gap energy of about 1.5 electron-volts.

In use for information storage the inventive material would not be heated as a unit. Rather, localized cells would have their temperature raised by suitable illumination by a laser, x-ray, electron or other energy beam that is absorbed by the material in its initial, opaque state. The heating produces the optical transition so that a transparent cell records the presence of an information bit. The cells not illuminated remain opaque recording the absence of an information bit. The information thus recorded could be recalled or read by scanning with an appropriate energy beam and sensor to determine whether the beam is transmitted or reflected. Obviously, a limit on the operating temperature of optical memory devices must be imposed to avoid alteration of the recorded information. The inventive materials may be safely operated at temperatures up to one half their glass transition temperatures referenced to 0° C. In the specific example we have described, the operating temperature could be as high as about 200° C. without danger. This feature represents a very substantial improvement over other chalcognide materials which begin irreversible transitions producing optical changes at temperatures as low as 50° C.

The invention has been described with reference to the certain preferred embodiments. The person of skill in the art will recognize various modifications and additions without departing from the spirit of the invention. Therefore, the scope of the invention is limited solely by the following claims.

We claim:

1. A device fo recording information in readable form comprising a film formed of a compound having a decrease in light absorbancy with increasing temperature and having a formula:

$$(A_xB_{1-x})_{1-y}S_y$$

where x is greater than zero and less than one, y is at least equal to 0.67 and is less than 1, A and B are different elements each chosen from silicon, tin and lead and S is chosen from selenium and sulfur and mixtures thereof.

2. The device of claim 1 including a protective layer disposed on said film.

3. The device of claim 2 wherein said protective layer is optically transparent.

4. The device of claim 3 wherein said layer is cesium iodide.

5. The device of claim 3 wherein said layer is silicon dioxide.

6. The device of claim 1 wherein said film is disposed on an optically transparent substrate.

7. The device of claim 1 wherein A is silicon, B is tin and S is sulfur.

8. The device of claim 7 wherein x equals about 0.9 and y equals about 0.7.

* * * * *